US011458859B2

(12) United States Patent
Stentenbach

(10) Patent No.: US 11,458,859 B2
(45) Date of Patent: Oct. 4, 2022

(54) CHARGING ASSEMBLY FOR AN ELECTRIC VEHICLE ON A MEDIUM VOLTAGE NETWORK, AND METHOD FOR OPERATING SAME

(71) Applicant: SCIENLAB BETEILIGUNGSGESELLSCHAFT MBH, Bochum (DE)

(72) Inventor: Julian Stentenbach, Bochum (DE)

(73) Assignee: SCIENLAB BETEILIGUNGSGESELLSCHAFT MBH, Bochum (DE)

( * ) Notice: Subject to any disclaimer, the term of this patent is extended or adjusted under 35 U.S.C. 154(b) by 47 days.

(21) Appl. No.: 16/768,094

(22) PCT Filed: Nov. 30, 2018

(86) PCT No.: PCT/DE2018/100974
§ 371 (c)(1),
(2) Date: May 29, 2020

(87) PCT Pub. No.: WO2019/105513
PCT Pub. Date: Jun. 6, 2019

(65) Prior Publication Data
US 2020/0307406 A1    Oct. 1, 2020

(30) Foreign Application Priority Data

Dec. 1, 2017    (DE) ..................... 10 2017 128 573.3

(51) Int. Cl.
*B60L 53/67*    (2019.01)
*B60L 53/30*    (2019.01)
(Continued)

(52) U.S. Cl.
CPC ............... *B60L 53/67* (2019.02); *B60L 53/16* (2019.02); *B60L 53/18* (2019.02); *B60L 53/305* (2019.02);
(Continued)

(58) Field of Classification Search
CPC .............................. B60L 53/67; H02J 7/0045
(Continued)

(56) References Cited

U.S. PATENT DOCUMENTS

2012/0249070 A1* 10/2012 Sellner .................. B60L 3/0069
320/109
2013/0234675 A1* 9/2013 King ....................... H02J 7/022
320/163

(Continued)

FOREIGN PATENT DOCUMENTS

DE    102010014417 A1    10/2011
DE    102011084362 A1    10/2012
(Continued)

OTHER PUBLICATIONS

Office Action for German Application No. 10 2017 128 573.3 dated Jul. 25, 2018; 16pp.
(Continued)

*Primary Examiner* — Suchin Parihar
(74) *Attorney, Agent, or Firm* — Hauptman Ham, LLP

(57) ABSTRACT

A charging arrangement for an electric vehicle having a traction battery includes a charging station connected to a medium-voltage grid and a charging cable to be coupled to the electric vehicle, wherein a medium-voltage transformer is arranged in the charging station, at which medium-voltage transformer the medium voltage is present on a primary side and at least one IT low-voltage grid and a TN low-voltage grid electrically isolated therefrom are formed on a secondary side.

16 Claims, 9 Drawing Sheets

(51) Int. Cl.
  *H02J 7/00* (2006.01)
  *H02J 7/02* (2016.01)
  *B60L 53/16* (2019.01)
  *B60L 53/31* (2019.01)
  *B60L 53/18* (2019.01)
  *B60L 53/63* (2019.01)
  *B60K 6/28* (2007.10)

(52) U.S. Cl.
  CPC ............... *B60L 53/31* (2019.02); *B60L 53/63* (2019.02); *H02J 7/00032* (2020.01); *H02J 7/0045* (2013.01); *H02J 7/02* (2013.01); *B60K 6/28* (2013.01); *B60L 2210/10* (2013.01); *B60Y 2200/91* (2013.01); *B60Y 2200/92* (2013.01); *B60Y 2300/91* (2013.01); *H02J 2207/20* (2020.01)

(58) Field of Classification Search
  USPC .......................................................... 320/109
  See application file for complete search history.

(56) References Cited

U.S. PATENT DOCUMENTS

| | | | |
|---|---|---|---|
| 2016/0141967 A1 | 5/2016 | Yan et al. | |
| 2016/0363918 A1* | 12/2016 | Einfalt | H02J 3/382 |
| 2016/0375781 A1 | 12/2016 | Herke et al. | |
| 2017/0057369 A1* | 3/2017 | Næsje | B60L 53/14 |
| 2018/0219381 A1* | 8/2018 | Laval | H02J 3/32 |
| 2018/0290548 A1 | 10/2018 | Kalkmann | |
| 2019/0106000 A1* | 4/2019 | Heyne | H02J 7/0029 |
| 2019/0106008 A1* | 4/2019 | Heyne | H02J 7/022 |
| 2019/0157869 A1* | 5/2019 | Gadh | H02J 7/0014 |
| 2020/0298722 A1* | 9/2020 | Smolenaers | B60L 53/24 |
| 2021/0188106 A1* | 6/2021 | Asa | H02M 1/4233 |

FOREIGN PATENT DOCUMENTS

| | | |
|---|---|---|
| DE | 102013211265 A1 | 12/2014 |
| DE | 102013219545 A1 | 4/2015 |
| DE | 102015110023 A1 | 12/2016 |
| DE | 102017107355 A1 | 10/2018 |
| EP | 2930813 A1 | 10/2015 |
| WO | 2015135911 A1 | 9/2015 |

OTHER PUBLICATIONS

International Search Report and Written Opinion of International Application No. PCT/DE2018/100974 dated Sep. 5, 2019; 19pp.

Kretschman et al. "Explanations" Bender GmbH & Co. KG, Gruenberg, Germany, Jul. 30, 2018; pp. 1-10; 20pp.

"Electric Security for Electromobility" Bender The Power in Electrical Safety, Jul. 30, 2018; pp. 1-10; 20pp.

* cited by examiner

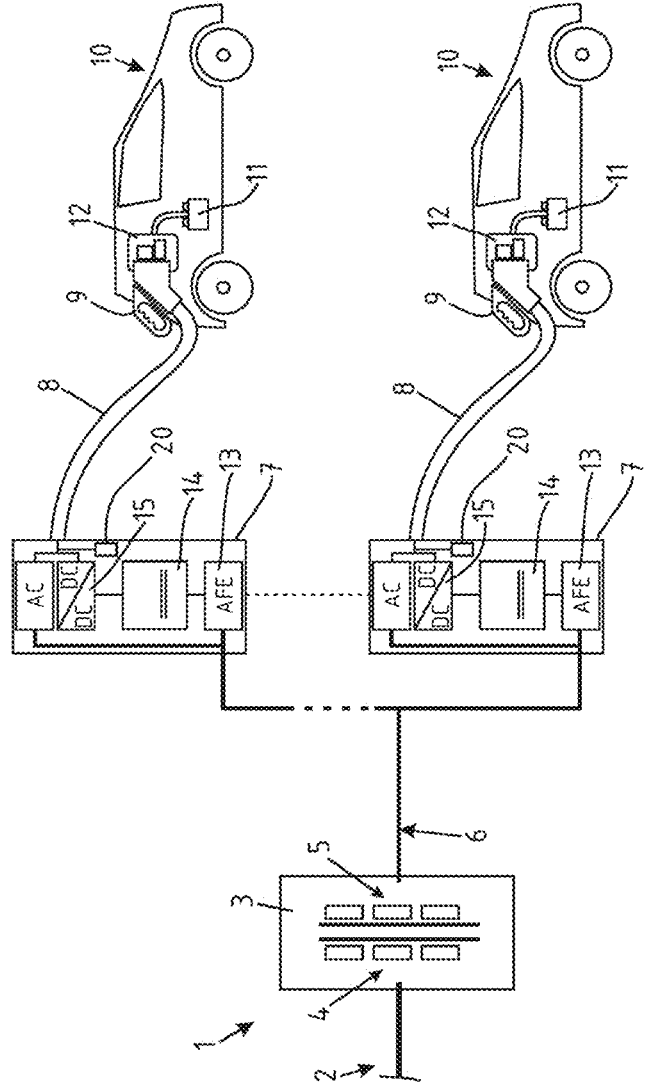

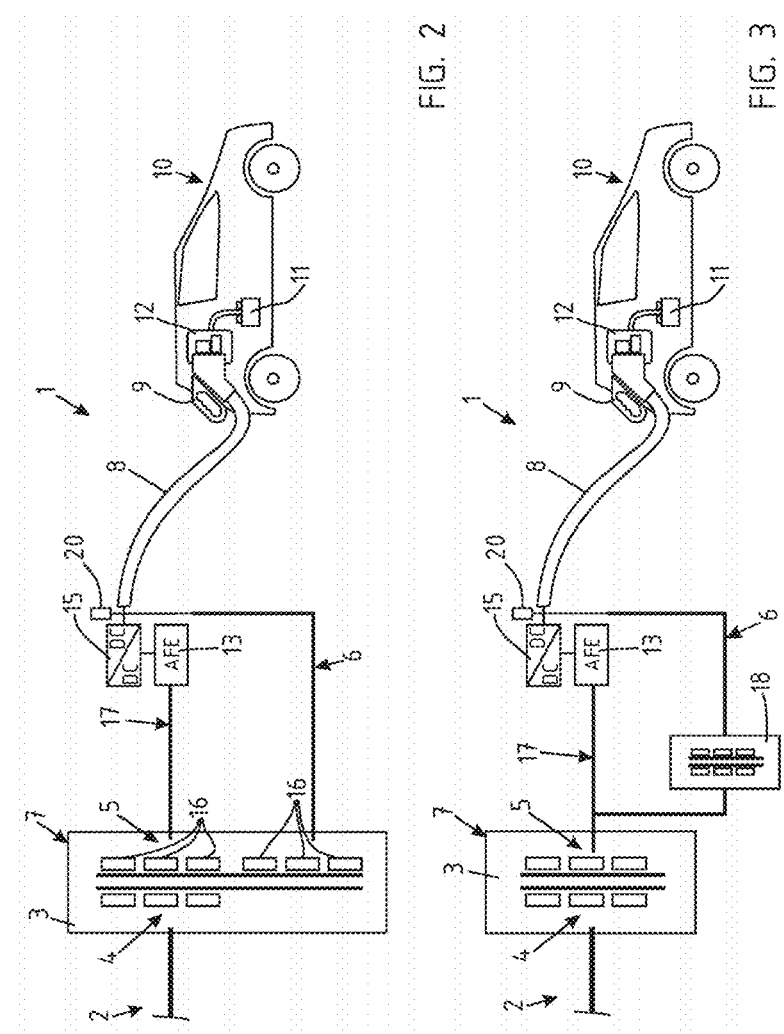

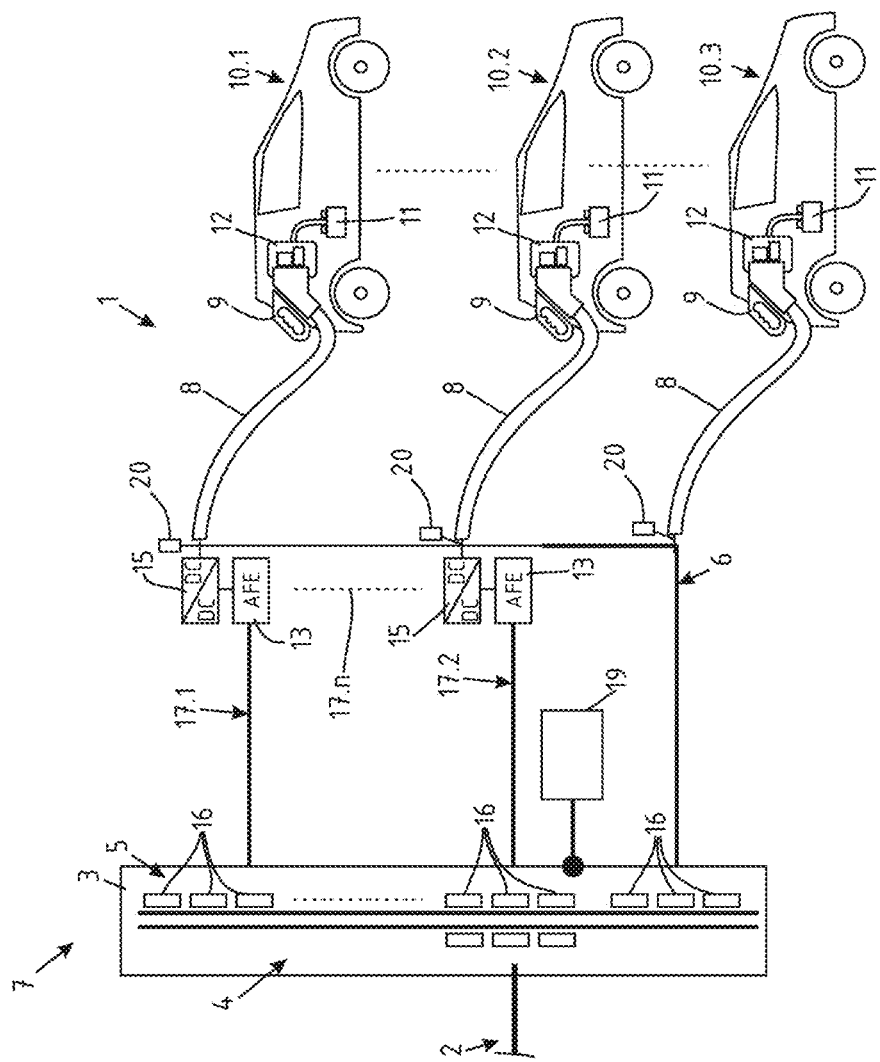

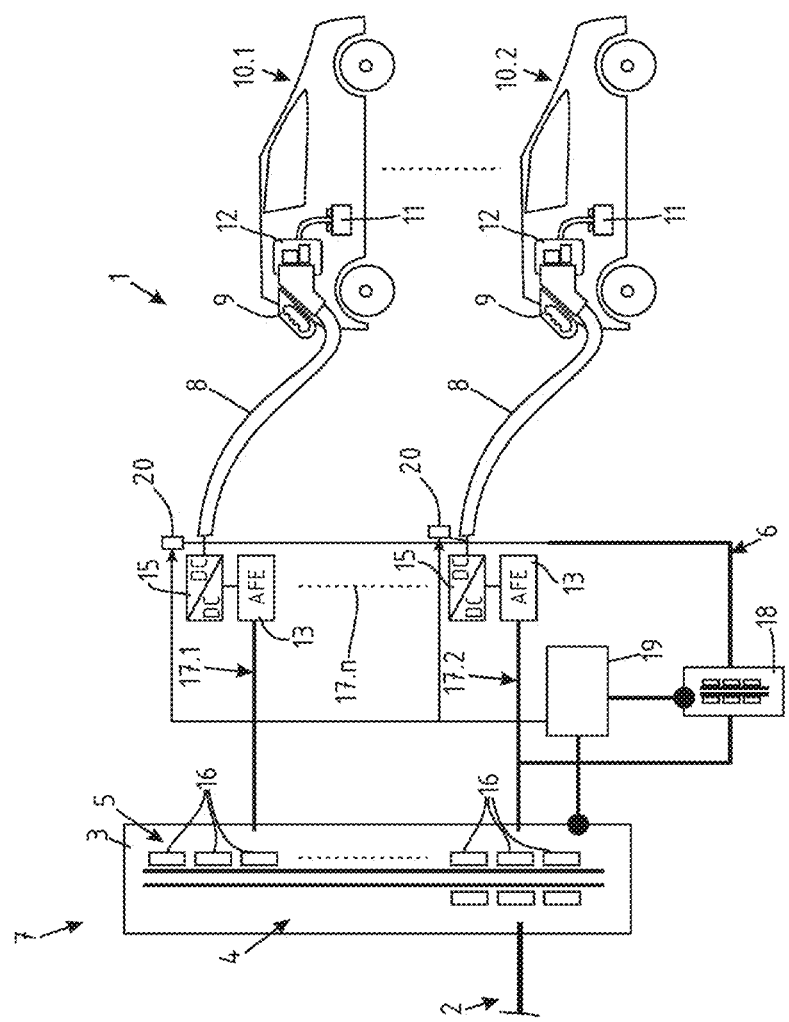

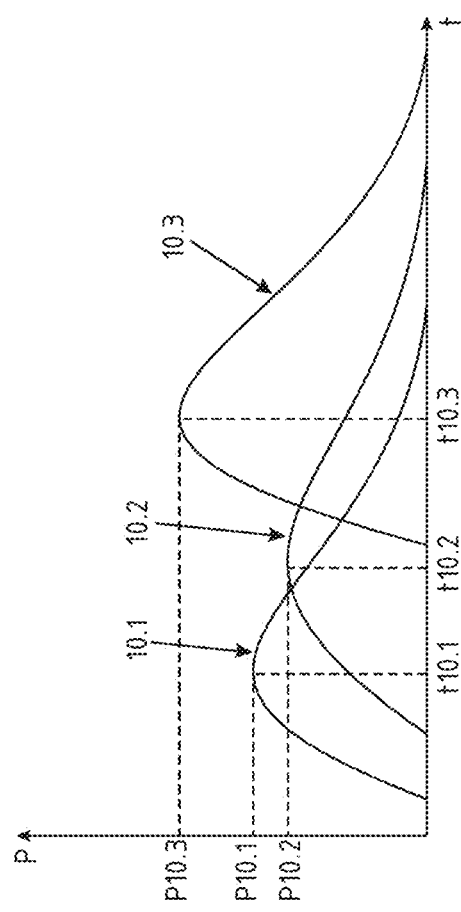

CHARGING ASSEMBLY FOR AN ELECTRIC VEHICLE ON A MEDIUM VOLTAGE NETWORK, AND METHOD FOR OPERATING SAME

RELATED APPLICATIONS

The present application is a National Phase of International Application Number PCT/DE2018/100974 filed Nov. 30, 2018 claims priority from German Application No. 10 2017 128 573.3, filed Dec. 1, 2017.

FIELD

The present disclosure relates to a charging arrangement for an electric vehicle having a traction battery that is connected to a medium-voltage grid.

BACKGROUND

In order to electrically drive an electric or hybrid vehicle, it is necessary for the battery, hereinafter also called traction battery, of the electric vehicle to be charged via an external energy source. In this case, the energy is supplied via a plug system having a charging cable by way of which the external energy source is connected to the vehicle so that the charging procedure is able to take place.

In order to achieve a standard, the charging procedure is defined in various standards. In this case, a fundamental distinction is drawn between an AC charging procedure and a DC charging procedure. In an AC charging procedure, the electric vehicle is connected directly to a socket, for example to a household socket, which is single-phase or three-phase, by way of the charging cable. The powers able to be transmitted are in this case limited to around 22 kW.

In order to achieve higher charging powers, what is known as DC charging technology is used. In this DC charging technology, an external charging station provides a DC voltage that is forwarded to the vehicle via a charging cable and, within the vehicle, directly to the traction battery. The fact that charging powers of up to 350 kW are thereby achieved is part of the prior art.

To this end, provision is made for charging stations that should provide the possibility, now and in the future, of charging electric vehicles—in the same way as filling stations for combustion engines. Such charging stations may also be referred to as charging columns.

The fact that charging stations are connected to a low-voltage grid and are thereby supplied with a supply voltage that is in turn converted and output to the motor vehicle as charging voltage is part of the prior art. The low-voltage grids are designed as a TN grid or TN system. TN in this case stands for "terre neutre" [earthed neutral].

The electric vehicle is then charged via the AC voltage or via the DC voltage, depending on the on-board charging management. In the DC charging procedure, the IEC 61851-23 standard prescribes that the DC voltage to the vehicle must be designed as an IT grid in order to guarantee electrical safety. IT in this case stands for "isolé terre" [isolated earth]. For this reason, the charging stations are equipped with galvanic isolation, wherein this is typically connected between the converter and an output controller. The galvanic isolation is in this case formed by a resonant transformer according to the prior art.

In summary, this however means that the charging stations and the infrastructure directly surrounding the charging stations have a relatively complex design. It is necessary to provide several electrical components for a distributed voltage, which is usually a medium voltage, in the immobile charging infrastructure, wherein not only the investment costs for constructing charging stations but also the maintenance and servicing costs of such a charging station are high. These costs ultimately have to be borne by the consumer through an increased kilowatt-hour price. The electrical components have to be purchased when they are first installed and maintained during operation and exchanged when necessary. Operating costs are sometimes also high, since it is necessary to perform cooling measures for the electrical components.

SUMMARY

The object of the present disclosure is therefore to provide a charging arrangement having few components but with at the same time increased charging power in comparison with the prior art that makes it possible to construct a charging infrastructure for electric vehicles.

The charging arrangement for an electric vehicle having a traction battery has a charging station that is connected directly to a medium-voltage grid. The charging station furthermore has a charging cable to be coupled to the electric vehicle. The charging arrangement is then distinguished, according to the disclosure, in that a medium-voltage transformer is arranged in the charging station, at which medium-voltage transformer the medium voltage is present on a primary side and at least one IT low-voltage grid and a TN low-voltage grid electrically isolated therefrom are formed directly on a secondary side.

The key advantage of the disclosure is that both AC and DC charging procedures are able to be performed with the charging station according to the disclosure. At the same time, the components required to construct the charging station are reduced in comparison with charging stations known from the prior art. This is due to the fact that the IT low-voltage grid is formed directly on the secondary side of the medium-voltage transformer, wherein the medium-voltage transformer itself is connected directly to a medium-voltage grid on the primary side. Further power transformers on the secondary side of the medium-voltage transformer as far as the electric vehicle may thus be dispensed with.

Within the scope of this disclosure, an electric vehicle is understood to mean an electric motor vehicle, and therefore a road vehicle, for example a car or a lorry. It may likewise be understood to mean fork-lift trucks or even special vehicles. An electric vehicle may however also be understood to mean aircraft or watercraft. These may be purely electrically driven or else designed as what is called a hybrid vehicle having an additional motor for generating electrical energy, for example an internal combustion engine.

A medium-voltage grid is a supply voltage that is present in the infrastructure of a respective country in which such a charging arrangement is intended to be set up. Said supply voltage is usually more than 1000 V and less than 100 kV. A medium voltage is typically between 5 kV and 25 kV, e.g., 10 kV, 12 kV or else 20 kV. The low voltage of a low-voltage grid is less than 1500 V and is typically between 200 V and 800 V, between 400 V and 690 V.

The medium-voltage grid, the TN low-voltage grid and the IT low-voltage grid are a three-phase design. They may however also be produced in single-phase, two-phase or multiphase form.

The IT low-voltage grid and the TN low-voltage grid electrically isolated therefrom are galvanically isolated from one another. They are thus not electrically connected to one another. Within the scope of the disclosure, further IT low-voltage grids may also be formed by at least one additional secondary winding on the medium-voltage transformer. The IT low-voltage grids are then likewise designed to be electrically isolated from one another on the secondary side, and thus designed to be galvanically isolated.

The idea according to the disclosure then makes provision for no additional transformer to be provided on the low-voltage side for the DC charging procedure. An additional low-voltage transformer is thus dispensed with in a charging column itself. The medium-voltage transformer is used directly to provide both an IT low-voltage grid and a TN low-voltage grid.

The TN low-voltage grid may in this case, within the scope of the disclosure, be provided directly by the medium-voltage transformer by way of at least one additional secondary winding. The TN low-voltage grid is then transformed directly from the medium voltage by the medium-voltage transformer. The TN low-voltage grid may however also be formed by a low-voltage transformer, wherein the low-voltage transformer is then arranged in a secondary circuit on the secondary side of the medium-voltage transformer. What is however essential to the disclosure is that the low voltage of the IT low-voltage grid is provided directly by the medium-voltage transformer.

A converter and/or an output controller or compensation controller is additionally then provided on a respective IT low-voltage grid. The converter is for example an active front end (AFE), power factor correction (PFC) or a diode rectifier. The compensation controller is a DC/DC converter.

The IT low-voltage grid is used for a DC charging procedure. The TN low-voltage grid is used for AC charging procedures. Modern electric vehicles are mostly equipped with an AC charging standard. However, many vehicles also already have the combined option of also performing DC charging procedures. Due to the relatively high charging power to be transmitted, it should be expected in the future that a larger portion of electric vehicles will be capable of DC charging.

A further advantage is that the TN low-voltage grid is able to be used directly for AC charging and is supplied directly to the electric vehicle via the charging cable.

Provision is then furthermore also made for a fuse or switch that may be integrated for example in a charging plug or is provided on the charging station. If the intention is then to construct an electricity recharging facility that has a multiplicity of charging stations, then the charging arrangement according to the disclosure is suitable for this purpose. The charging station according to the disclosure with the medium-voltage transformer may thus for example simultaneously form two, three, four or more IT low-voltage grids. This is achieved by way of at least one winding arrangement, belonging to the respective IT low-voltage grid, on the secondary side of the medium-voltage transformer. Furthermore, a TN low-voltage grid is always formed at the same time. The TN low-voltage grid may thus be used for the simultaneous AC charging of a plurality of electric vehicles. Each IT low-voltage grid is used to charge an electric vehicle. It is possible to charge a plurality of electric vehicles simultaneously at the medium-voltage transformer. The present disclosure thus also relates to the use of a charging arrangement for charging at least one electric vehicle or a plurality of electric vehicles and to a method for operating the charging arrangement.

To this end, a charging management apparatus is furthermore provided, wherein the charging management apparatus is assigned to the medium-voltage transformer. The charging management apparatus in this case prescribes the maximum permissible power for all of the low-voltage grids. The charging management apparatus forwards these values to the respective charging communication module, hereinafter also called communication module, of an electric vehicle and/or of a charging plug, which in turn takes this information into account in the charging procedure. By way of example, a communication module may be provided in a charging plug on each charging cable. The medium voltage is thus present on the medium-voltage transformer on the primary side. The respective energy requirement for an electric vehicle is then recorded by the communication module and regulated or controlled by the charging management apparatus such that an energy draw from the secondary side of the medium-voltage transformer is then regulated or controlled for a respective low-voltage grid, e.g., IT low-voltage grid.

One advantageous development of the disclosure furthermore makes provision for a voltage converter to be arranged in the charging cable, in the charging plug of a charging cable. In this case, a voltage of greater than 900 V, greater than 1000 V, is transmitted through the charging cable and then converted to a smaller charging voltage for the electric vehicle by the voltage converter in the charging plug. This offers the advantage that a smaller diameter of the charging cable is made possible at the same or a higher charging power. The manufacturing costs of the charging cable are thereby able to be reduced, on the one hand, since these usually consist of copper, and copper, as a precious metal, has a high purchase price. On the other hand, handling of a charging cable is improved since the charging cable's associated own weight, which is not inconsiderable, is able to be reduced, such that it is able to be made easier for a respective driver of an electric vehicle to couple the charging plug in order to perform the charging procedure.

At the same time, the voltage converter may also serve as a regulation or control apparatus for performing the charging procedure with the electric vehicle. It is thus possible to dispense with additional control or regulation technology in the charging station that would otherwise be necessary in order firstly to communicate with the electric vehicle and in order secondly to regulate or to control the charging procedure. The electric vehicle thus communicates with the voltage converter in the charging plug. Said voltage converter then taps off the required voltage on the secondary side of the medium-voltage transformer, routes it through the charging cable and then outputs it to the electric vehicle in converted form. It is thus possible to reduce the line cross sections of the electrical conductors in the charging cable with at least the same and/or an increased charging power available at the charging plug.

Within the scope of the disclosure, it is thus possible to transmit voltages of more than 900 V, more than 1000 V, more than 1200 V via the charging cable. A realistic upper limit for the maximum voltage to be transmitted should however be at most 10 000 V, e.g., 5000 V. Within the scope of the disclosure, it has proven advantageous if voltages of 1000 V to 1500 V are transmitted. In this case, the IT low-voltage grid has such a voltage. The actual charging voltage may then be converted to a range from 400 V to 850 V, to 400 V or 800 V. The ratio of charging voltage to voltage transmitted via the charging cable is less than 0.9. This means that the charging voltage is less than 0.9 times the voltage transmitted via the charging cable, less than 0.85, less than 0.8, less than 0.75. The ratio should however be greater than 0.1.

The communication module provided in the charging plug may communicate firstly with the charging management apparatus of the charging station. It may optionally additionally also communicate with the electric vehicle, and here with the on-board charging management system of the electric vehicle. The communication may be wired, but also wireless, for example via Bluetooth or WLAN.

The present disclosure furthermore relates to a method for operating the charging arrangement, wherein at least n electric vehicles are charged simultaneously in different IT low-voltage grids on the secondary side of the medium-voltage transformer. n is in this case greater than or equal to (≥) 2. A further electric vehicle is optionally charged in the TN low-voltage grid. The maximum available charging power on the secondary side of the medium-voltage transformer is less than the required maximum charging power of the n electric vehicles added together. The maximum charging power available on the secondary side is less than 1.5 times the maximum required charging power of an electric vehicle. The charging power on the secondary side of the medium-voltage transformer corresponds to the same as the maximum required charging power of an electric vehicle. In order that all of the connected electric vehicles are then able to be charged as best possible, a charging management apparatus intervenes when the charging power required at one time and that all of the electric vehicles then call upon is greater than the charging power available on the secondary side by temporarily reducing the charging power made available to each electric vehicle for one or more electric vehicles.

This entails the advantage according to the disclosure that each electric vehicle is able to be charged as best possible, but at the same time the dimensioning of the medium-voltage transformer may turn out to be relatively small in comparison thereto. The costs that arise when setting up the charging arrangement according to the disclosure and also when operating the charging arrangement may thus be reduced.

A further advantageous method according to the disclosure makes provision for the maximum available charging power on the secondary side of the medium-voltage transformer to be temporarily exceeded by up to 1.5 times when the charging arrangement described at the outset is operated. For this purpose, use is made of low-frequency transformers that operate in a Hertz range of less than 100 Hertz, at 50 or 60 Hertz. Exceeding the maximum charging power available on the secondary side by up to 1.5 times is uncritical for a time interval of less than 10 minutes, less than 5 minutes, and does not require any increased cooling measures or the like. It is thus likewise possible to use a medium-voltage transformer that is dimensioned smaller to simultaneously charge a plurality of vehicles with the greatest possible charging power to be made available for each vehicle.

However, it is possible, using the charging arrangement described at the outset, both for one electric vehicle to be charged in the IT low-voltage grid in a DC charging procedure and for a further electric vehicle to be charged at least temporarily simultaneously in the TN low-voltage grid in an AC charging procedure.

In addition to the abovementioned operating method, is furthermore that the medium-voltage transformer is able to be operated at a lower electricity price from the energy supplier, since the kWh in the medium-voltage grid is less expensive than a kWh that is drawn from the energy supplier in a low-voltage grid.

BRIEF DESCRIPTION OF THE DRAWINGS

Further advantages, features, properties and aspects of the present disclosure are the subject matter of the following description. Various exemplary embodiments are illustrated in the schematic figures. These figures serve for ease of understanding of the disclosure and, in said figures:

FIG. 1 shows a charging arrangement according to the prior art,

FIG. 2 shows a charging arrangement according to the disclosure with an IT low-voltage grid and a TN low-voltage grid, FIG. 3 shows a design variant of the present disclosure having an additional low-voltage transformer for forming the TN low-voltage grid, FIGS. 4a and b each show a design variant of the charging arrangement according to the disclosure having 2 to n IT low-voltage grids and a TN low-voltage grid, FIG. 5 shows a design variant similar to FIG. 4, but with an additional low-voltage transformer, FIG. 6 shows a graph of power against time for the operation of a charging arrangement according to the disclosure in the case of a plurality of vehicles.

Figure 4B:
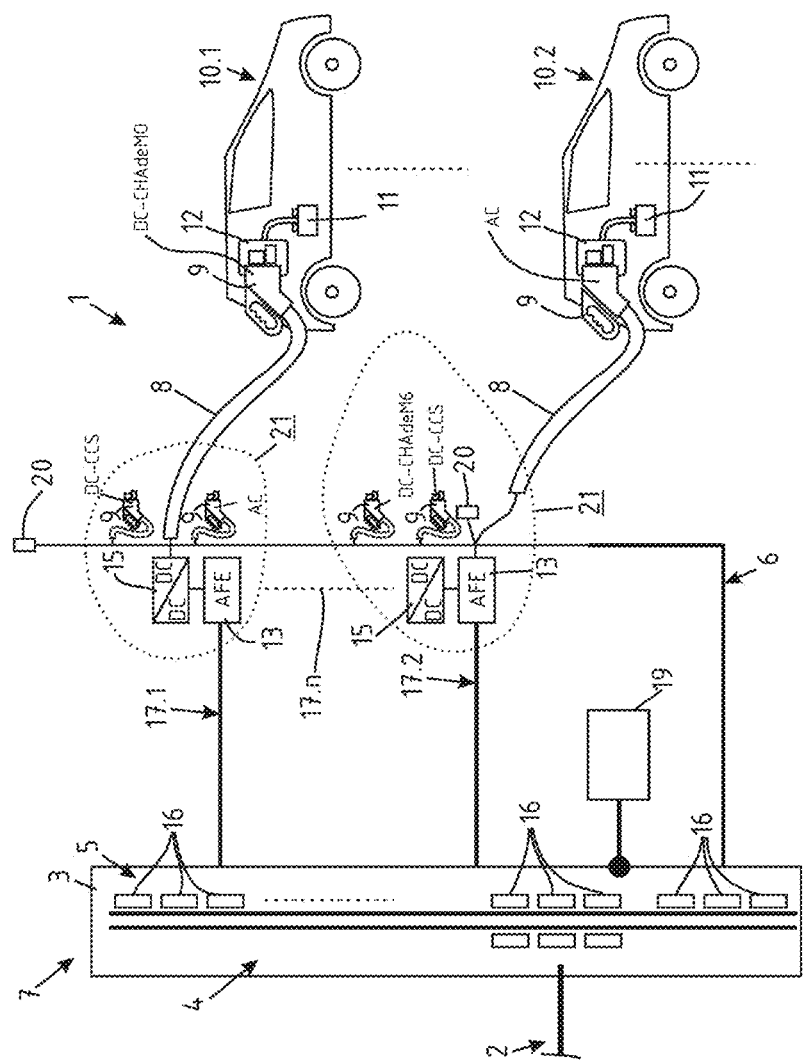

The same reference signs are used for identical or similar components in the drawings, even when a repeated description is not given for the sake of simplicity.

DETAILED DESCRIPTION

FIG. 1 shows a charging arrangement 1 as is known from the prior art. To this end, a medium-voltage grid 2 is formed as well as a medium-voltage transformer 3 that is connected to the medium-voltage grid 2 on its primary side 4 and provides a TN low-voltage grid 6 on its secondary side 5. A plurality of individual and in each case separate charging stations 7 are then connected to this low-voltage grid 6, wherein the charging stations 7 are in turn coupled to a respective electric vehicle 10 via a respective charging cable 8 and a charging plug 9. The electric vehicle 10 has a traction battery 11 that is charged accordingly. The electric vehicle 10 furthermore has an on-board charging manager 12 that communicates with the charging column 7 and for example selects between an AC charging procedure and a DC charging procedure. A converter 13, here in the form of an active front end, is furthermore provided in the charging column, as is galvanic isolation 14 and a compensation controller 15 in the form of a DC/DC converter. Electrical components should thus be accommodated in the charging column 7.

FIG. 2 shows a charging arrangement 1 according to the disclosure. In this case, a medium-voltage transformer is likewise connected directly to a medium-voltage grid 2 on the primary side 4. The inventive difference from FIG. 1 is however on the secondary side 5 of the medium-voltage transformer 3. Secondary windings 16 are directly present and then form an IT low-voltage grid 17 or supply voltage to same. A converter 13 in the form of an active front end and a compensation controller 15 in the form of a DC/DC converter are then also provided in this IT low-voltage grid 17. The charging cable 8 is then however connected directly to the IT low-voltage grid 17 in order to perform the charging procedure. Complex charging columns that are large in terms of installation space may thus be dispensed with. The charging column itself or the charging station 7 is formed by the medium-voltage transformer 3 itself or the medium-voltage transformer 3 is integrated directly into the charging station 7. Further secondary windings 16 are provided and simultaneously form a TN low-voltage grid 6 on the secondary side 5. This is formed here directly on the secondary side 5 of the medium-voltage transformer 3. The TN low-voltage grid 6 may be coupled directly to the charging cable 8 in order to perform an AC charging procedure. A fuse or switch for isolating AC and DC charging procedures is not illustrated for the sake of simplicity. The on-board charging manager 12 may then select the corresponding charging procedure via the charging plug 9 and a communication module 20 that is present. The communication module 20 may in this case be arranged in the region of the charging cable, but also in the charging plug.

One alternative design variant is illustrated in FIG. 3. An IT low-voltage grid 17 is likewise here formed directly on the medium-voltage transformer 3 on the secondary side 5. A low-voltage transformer 18 is however still provided and then forms the TN low-voltage grid 6. The subsequent structure in the direction of the electric vehicle 10 has a design similar to FIG. 2.

FIG. 4a shows an inexpensive expansion option for the charging arrangement 1 according to the disclosure. In this case, two IT low-voltage grids 17.1 and 17.2 and, in theory n further IT low-voltage grids 17.n arranged between them, may be formed on the secondary side 5 of the medium-voltage transformer 3. Each IT low-voltage grid 17 is assigned a dedicated secondary winding 16. A TN low-voltage grid 6 is likewise formed and is likewise assigned a dedicated secondary winding 16.

A charging management apparatus 19 is additionally provided and regulates or controls the charging procedure of the plurality of electric vehicles 10.1, 10.2 to be charged via the medium-voltage transformer 3. More detailed explanations in this regard may likewise be found in FIG. 6.

FIG. 4a also illustrates that a third electric vehicle 10.3 is charged at least temporarily at the same time via the TN low-voltage grid 6, that is to say as an AC charging procedure. An AC charging procedure would also be possible for the electric vehicles 10.1 and 10.2, since these may also be connected to the TN low-voltage grid 6. The electric vehicles 10.1 and 10.2 are however charged in a DC charging procedure in the IT low-voltage grid 17.1, 17.2, as is described above.

FIG. 4b shows a similar design variant, wherein each IT low-voltage grid 17.1, 17.n, 17.2 here forms a charging point 21. A charging point 21 is then for example a charging column. Each charging point 21 has up to three charging plugs 9. These may be split such that two charging plugs 9 for DC charging are provided in each charging point 21. A charging plug 9 may be designed for the DC-CCS standard and a further charging plug 9 may be designed for the DC-CHAdeMO standard. A third charging plug 9 may be provided for AC charging.

Up to three charging plugs 9 may thus be formed at each charging point 21 via the connection to the medium-voltage transformer 3. It is thereby possible to provide different charging standards at a charging point 21, and therefore a charging column. By way of example, the upper electric vehicle 10.1 with respect to the image plane is charged in the DC-CHAdeMO standard and the lower electric vehicle 10.2 is charged in an AC charging procedure.

It is however also possible within the scope of the disclosure to equip the individual charging points 21 differently from one another. This may mean that a charging point 21 may for example have only one DC charging plug. This may optionally be designed in accordance with the DC-CCS standard or in accordance with the DC-CHAdeMO standard or else another standard. A further charging point 21 of this charging station 7 may then have two or even three charging plugs 9. By way of example, two charging plugs 9 may be provided for DC charging, one for DC-CHAdeMO charging, and another one for DC-CCS charging. A third charging plug 9 would then be provided for an AC charging procedure. Any desired number of further charging points 21 may be connected to the charging arrangement 1. Each charging point 21 may then have an individual number of charging plugs 9. It may be defined individually for each charging point 21 whether this should be designed for DC charging, AC charging or combined DC and AC charging or for simultaneously providing DC and AC charging procedures.

FIG. 5 shows a structure similar to FIG. 4, with the difference that the TN low-voltage grid 6 is formed by a low-voltage transformer 18 in the IT low-voltage grid 17.2. The charging management apparatus 19 is then likewise connected to the low-voltage transformer 18. According to FIGS. 4 and 5, a plurality of electric vehicles 10.1, 10.2 may thus be charged simultaneously in respective AC or DC charging procedures. In the case of AC charging procedures, all of the AC charging procedures are supplied with voltage via the TN low-voltage grid 6. In the case of a DC charging procedure, a respective electric vehicle 10 is then supplied with voltage from a respective IT low-voltage grid 17.

The charging power required for the charging procedure is not constant over time. It initially increases from the start of the charging procedure until the maximum charging voltage is reached. The charging power then decreases again. This means that, at the time at which the maximum charging power has to be made available, the charging station 7 also has to make the maximum charging power available to this electric vehicle 10. In practice, however, two or more vehicles are not connected to the charging station 7 at exactly the same time with the same state of discharge of the traction battery 11, but rather at different times. If the maximum charging power is to be made available to each electric vehicle 10, this does not mean that the charging station 7 has to be designed to be able to make available n (n=number of connected electric vehicles) times the maximum charging power. In principle, the charging station 7 has to be able to make the maximum charging power available only once, or make a charging power slightly above, for example 2 times the maximum required charging power, available for an electric vehicle 10. This determines the design of the capacity of the medium-voltage transformer 3. The maximum charging power of an electric vehicle should be 350 kW within the scope of the disclosure, and therefore the maximum charging power of the medium-voltage transformer should be less than 700 kW. It is thus possible to simultaneously charge at least two, several electric vehicles 10 with the best possible charging power required at the respective charging time of an electric vehicle 10, which charging power does not however correspond to the respective maximum charging power at one time. In spite of the medium-voltage transformer 3 being dimensioned smaller than in the prior art, this thus does not have a negative impact on the charging time. Each electric vehicle 10 is thus able to be charged effectively in terms of time and therefore with the shortest possible charging time and the greatest possible required charging power in a time-dependent manner at a respective time. In this case, it is unimportant whether the electric vehicles are in AC and/or DC charging operation. Only the charging powers are relevant.

This charging procedure is illustrated by way of example in FIG. 6. The electric vehicle 10.1 has a maximum charging power P 10.1 at the time t 10.1. The same is the case for the electric vehicles 10.2 and 10.3. The respective maximum required charging powers of a respective electric vehicle 10 differ from one another. The electric vehicle 10.3 requires the greatest charging power P 10.3 in relation to the other electric vehicles 10.1, 10.2. This may be due to two reasons. Firstly, the state of discharge of the traction battery 11 of the electric vehicle 10.3 is different from the electric vehicles 10.2 and 10.3 and/or the traction battery 11 or the on-board charging manager 12 of the electric vehicle 10.3 may process a greater charging power. It is apparent from the schematic graph of power against time in FIG. 6 that, at one time, a n-multiple value of the respective maximum charging power P10.1, P10.2, P10.3 is not required, but rather the respective maximum charging power is required at different times. It is thus sufficient, even in the case of the temporally overlapping charging of three electric vehicles 10.1, 10.2, 10.3, to provide a maximum charging power that corresponds for example to 1.5 times the maximum charging power P10.3 of the electric vehicle 10.3 via the charging station 7.

The charging arrangement 1 according to the disclosure may be designed such that the maximum charging power required individually for the electric vehicle 10 at one time is tapped off at the secondary sides 5 of the medium-voltage transformer 3 in each IT low-voltage grid 17 and the TN low-voltage grid 6. If, at one time, the currently required charging powers P10.1, P10.2, P10.3 of all of the electric vehicles 10.1, 10.2, 10.3 together exceed the maximum power able to be made available by the medium-voltage transformer 3 on the secondary side 5, the charging management apparatus 19 may intervene and reduce the required charging powers and split the available charging power. Under some circumstances, however, such a temporary intervention is negligible or barely perceptible for the charging procedure of each electric vehicle 10.

According to FIG. 4 or 5, a plurality of charging columns may be connected to a medium-voltage transformer 3, such that a plurality of electric vehicles 10 are able to be charged simultaneously with AC and/or DC charging.

The charging power P, required during charging, of an electric vehicle 10 is not constant over the time t but rather initially increases from the start of charging until the maximum required charging voltage is reached. This is also the time at which the corresponding charging column has to make the maximum charging power P available for this electric vehicle. The charging power P then decreases again since the charging current is also reduced. In practice, two electric vehicles 10 are never connected at exactly the same time to a respective charging column and/or the electric vehicles 10 connected in parallel have different states of charge. The start of charging and/or the currently required charging power P are thus typically temporally offset.

Figure 7:
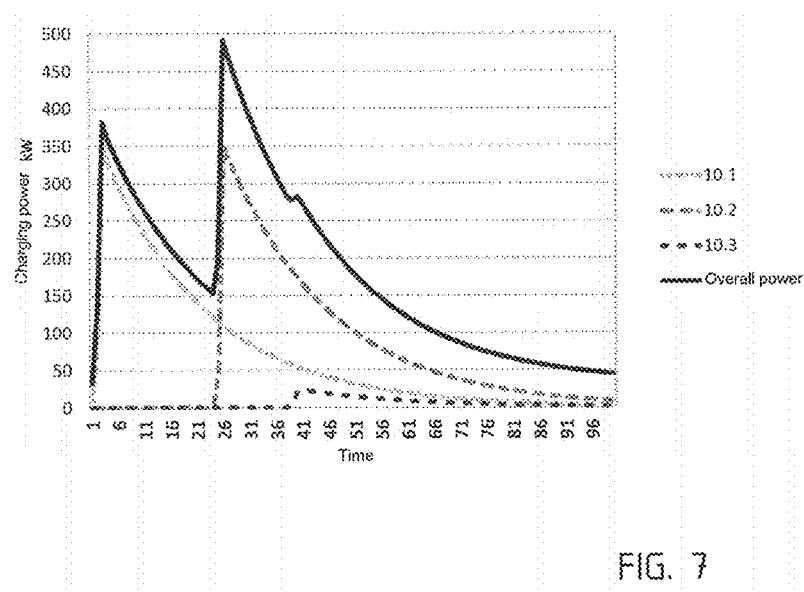
FIGS. 7 to 9 show various graphs of power against time for the operation of a charging arrangement.

FIG. 7 now shows an example of a charging arrangement 1 with three electric vehicles 10. Different dot-and-dash lines are illustrated for the electric vehicles (=vehicle). The solid line corresponds to the respectively required overall power. The reference vehicle 1 is selected for the first electric vehicle 10.1, the reference vehicle 2 is selected for the second electric vehicle 10.2 and the reference vehicle 3 is selected for the third electric vehicle 10.3. The respective charging procedure of each electric vehicle 10 begins at different times. At the time t1, the first electric vehicle 10 starts with a maximum charging power P of 350 kW. This then also corresponds to the currently required overall power. At a later time t26, a second electric vehicle 10 is connected and likewise charged with a maximum of 350 kW. The third electric vehicle 10 is operated with AC charging at the time t41 (at a maximum for example of about 22 kW). The respectively currently required overall power on the secondary side 5 of the medium-voltage transformer 3 is illustrated in the curve with a solid line. In this example, it reaches a maximum of around 460 kW. The advantage of the disclosure comes to the fore here: It is possible to perform a plurality of charging operations each with a maximum required charging power P of an electric vehicle 10 of 350 kW on a charging arrangement 1, even though the medium-voltage transformer 3 is operated with a lower maximum charging power P on the secondary side 5 of less than twice the maximum charging power P required by the electric vehicles 10. The medium-voltage transformer 3 may thus have a maximum charging power P of for example 500 kW on the secondary side 5, instead of 2*350 kW=700 kW, which reduces manufacturing costs. If on the other hand the charging arrangement 1 is constructed in accordance with FIG. 1 according to the prior art, each charging column and thus each resonant converter has to be designed for 350 kW each, which correspondingly represents high costs.

Figure 8:
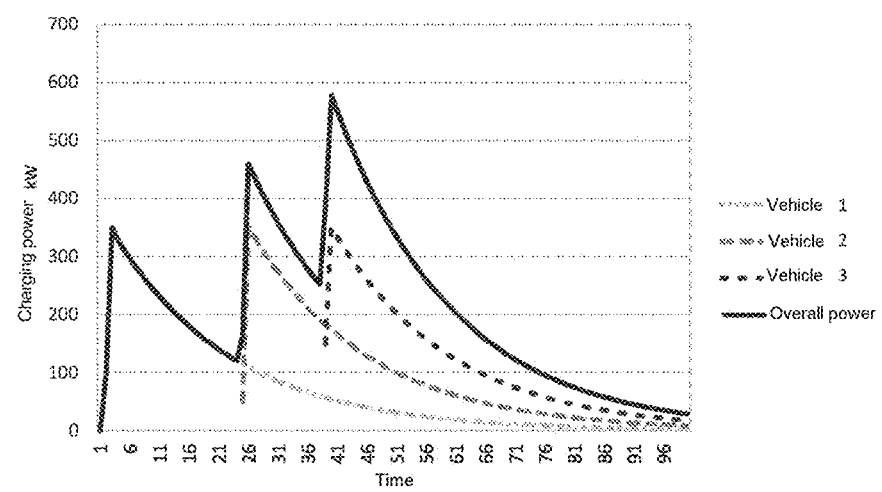
Figure 9:
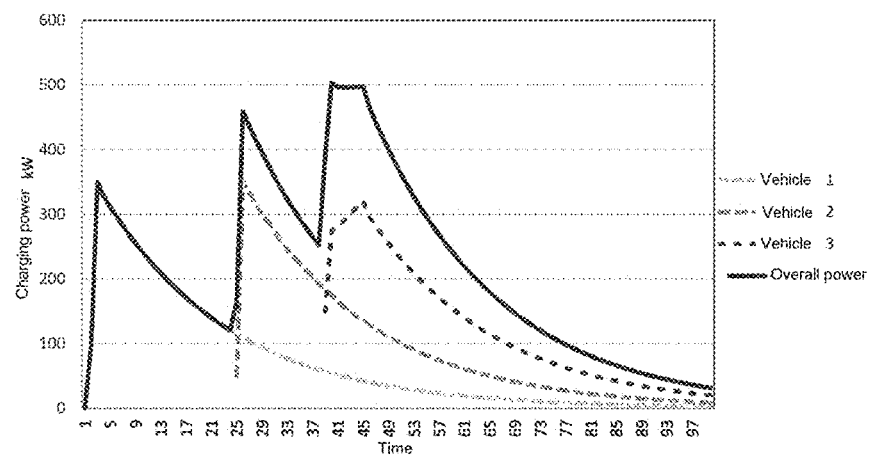

FIG. 8 furthermore shows how the overall power is split when the third electric vehicle 10 is also intended to be charged with 350 kW charging. The permissible overall power of 500 kW, for example, would then be exceeded between t41 and t46. The charging management apparatus 19 is then used here: This determines the respective currently required overall power of all of the charging procedures. At the time t41, it is determined that the charging power P must be limited. This is achieved by the charging management apparatus 19 intervening and for example temporarily reducing and/or limiting the available charging power P of the electric vehicle 10.3 via the corresponding charging communication module 20.

By virtue of briefly reducing the maximum charging power P of the electric vehicle 10.3 through the charging management apparatus 19, the overall power of 500 kW is not exceeded on the medium-voltage transformer. The charging procedure of the third vehicle 10.3 is however only extended slightly.

A further advantage of the disclosure is that the medium-voltage transformer 3 is able to be operated briefly (several minutes up to 30 minutes) at an increased overload of for example the factor 1.5. In order to monitor the overload of the medium-voltage transformer 3, the temperature of the transformer windings and/or the temperature of the transformer core may be monitored. The charging management apparatus 19 may thus increase the maximum overall power as required by monitoring the temperature. The increase is by a maximum of the factor 1.5.

Within the scope of the disclosure, the overall power of the medium-voltage transformer 3 on the secondary side 5 may be dimensioned to less than or equal to the maximum charging power of an electric vehicle, for example less than or equal to ($\leq$) 350 kW. A plurality of electric vehicles 10 may however be charged simultaneously with a maximum charging power P according to the abovementioned scheme. The charging management apparatus 19, in order to determine the respectively individually required maximum charging power P of an electric vehicle 10, has to have the information of the current charging power of the individual charging operations communicated thereto. This may be performed separately via the communication modules in a wired manner or wirelessly for each electric vehicle. As an alternative, the charging management apparatus 19 may also measure the current charging power P using sensors. The temperatures of the medium-voltage transformer 3 (core and/or windings) are measured and likewise communicated to the charging management apparatus 19. By virtue of these measurements, the charging management apparatuses 19 are able to evaluate the respective current charging powers P and define and possibly reduce the respective maximum charging powers P for each electric vehicle.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A charging arrangement for an electric vehicle having a traction battery, the charging arrangement comprising:
   a charging station connected to a medium-voltage grid, the medium-voltage grid having a current between 5 kV and 25 kV;
   a charging cable having a charging plug to be coupled to the electric vehicle;
   a medium-voltage transformer arranged in the charging station, wherein the medium-voltage transformer comprises
      a primary side connected to the medium-voltage grid, and
      a secondary side;
   on the secondary side of the medium-voltage transformer, at least one IT (isolated earth) low-voltage grid, and
      a TN (earthed neutral) low-voltage grid isolated from the at least one IT low-voltage grid, wherein the at least one IT low-voltage grid comprises different IT low-voltage grids;
   at least n electric vehicles are configured to be charged simultaneously in the different IT low-voltage grids, wherein n≥2;
   a maximum available charging power on the secondary side of the medium-voltage transformer is less than a sum of required maximum charging powers of all the n electric vehicles; and
   when required charging powers of two or more electric vehicles added together at one time is greater than a charging power available on the secondary side of the medium-voltage transformer, temporarily reducing the charging power respectively made available to each of the two or more electric vehicles.

2. The charging arrangement according to claim 1, wherein
   the TN low-voltage grid is directly formed by at least one secondary winding of the medium-voltage transformer.

3. The charging arrangement according to claim 1, wherein
   the TN low-voltage grid is configured for AC charging.

4. The charging arrangement according to claim 1, wherein
   the at least one IT low-voltage grid comprises different IT low-voltage grids formed by different secondary windings of the medium-voltage transformer.

5. The charging arrangement according to claim 4, wherein
   the IT low-voltage grids are isolated from each other.

6. The charging arrangement according to claim 1, further comprising:
   a charging management apparatus configured to regulate or control all of the IT and TN low-voltage grids.

7. The charging arrangement according to claim 6, wherein
   the medium-voltage transformer on the secondary side has a maximum charging power value less than or equal to 700 kW, and
   the charging management apparatus is configured to
      determine a charging power of each charging procedure for the electric vehicle, and
      communicate the determined charging power to a corresponding charging communication module for the charging procedure.

8. The charging arrangement according to claim 1, wherein
   the IT low-voltage grid has at least one of a converter or a compensation controller.

9. The charging arrangement according to claim 1, wherein
   the charging cable has a voltage converter arranged in the charging plug,
   the charging cable is configured to transmit a voltage of greater than 900 V, and
   the voltage converter is configured to convert the voltage of greater than 900 V to a smaller charging voltage.

10. The charging arrangement according to claim 6, wherein
    the charging plug has a communication module configured to communicate with at least one of the vehicle or the charging management apparatus.

11. The method according to claim 1, wherein
    the maximum available charging power on the secondary side of the medium-voltage transformer is temporarily exceeded by up to 1.5 times.

12. The method according to claim 1, further comprising:
    charging a further electric vehicle in the TN low-voltage grid at least temporarily simultaneously with the charging of an electric vehicle in one of the IT low-voltage grids.

13. The method according to claim 1, wherein
    the maximum available charging power on the secondary side of the medium-voltage transformer is less than 1.5 times the required maximum charging power of an electric vehicle among the n electric vehicles.

14. The method according to claim 1, wherein
    the maximum available charging power on the secondary side of the medium-voltage transformer is equal to the required maximum charging power of an electric vehicle among the n electric vehicles.

15. The charging arrangement according to claim 1, wherein
    the TN low-voltage grid comprises a low-voltage transformer, and the low-voltage transformer is arranged in a secondary circuit on the secondary side of the medium-voltage transformer.

16. The charging arrangement according to claim 1, wherein
    the at least one IT low-voltage grid is configured for DC charging.

* * * * *